Sept. 13, 1960
C. CHANDLER
2,952,283
WORK CLAMPS
Filed Aug. 15, 1957
2 Sheets-Sheet 1
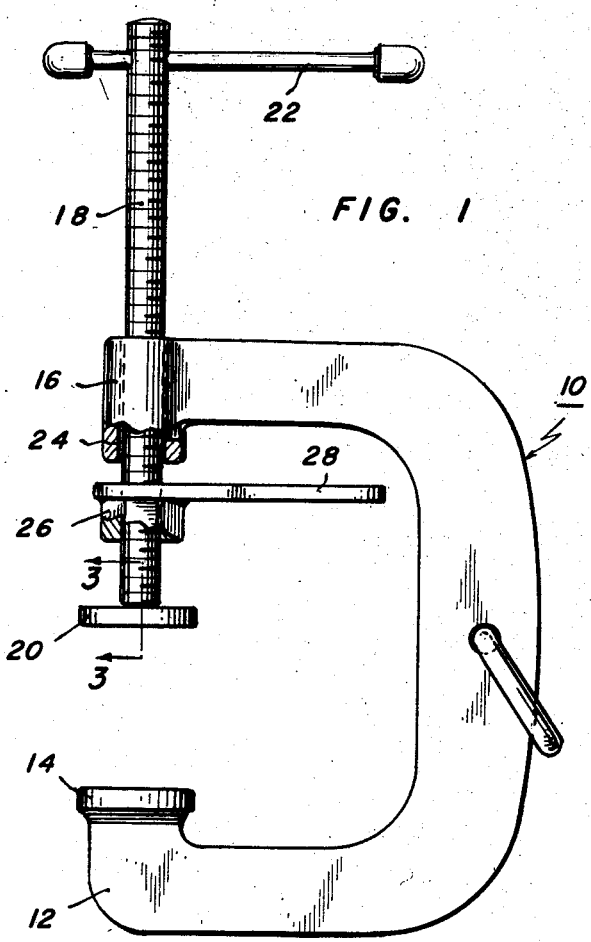
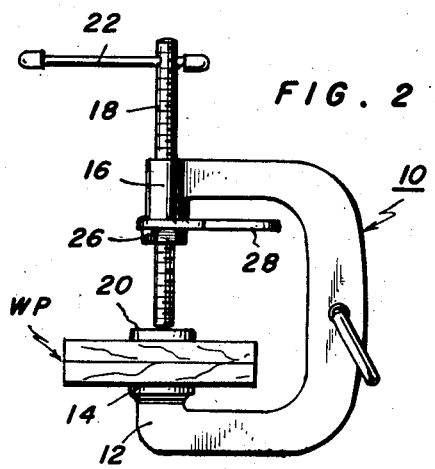
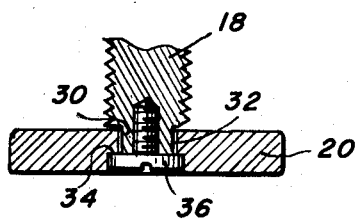
INVENTOR
CLARK CHANDLER
BY
ATTORNEY Sept. 13, 1960

C. CHANDLER 2,952,283

WORK CLAMPS

Filed Aug. 15, 1957

INVENTOR.
CLARK CHANDLER
BY
ATTORNEY

United States Patent Office 2,952,283
Patented Sept. 13, 1960

2,952,283

WORK CLAMPS

Clark Chandler, 3600 W. 15th St., Panama City, Fla.

Filed Aug. 15, 1957, Ser. No. 678,331

2 Claims. (Cl. 144—304)

This invention relates to improvements in work clamps and will be described in its application to C-clamps, although it is adaptable to work clamping tools generally.

As is well known, the conventional C-clamp, so-called because of the C shape of its frame or beam, employs a clamping screw which is threaded to the correspondingly threaded nut end of the C-frame through which it extends. Accordingly, both to advance the screw toward and to tighten or jam its jaw end onto the work, it must be turned by hand, as by means of a crank or handle affixed to its outer end. This requirement to turn the screw so as to advance it to the work is objectionable both because it represents a time-consuming operation and because due to space limitations the crank or handle is not always readily accessible for turning. Turning of the screw to tighten it on the work is also objectionable, due to the tendency of the free end of the screw when forcibly turned to twist one part or piece of the work with respect to the other part or piece being clamped, a tendency which is more noticeable as the threads of the screw and nut end of the frame and/or the usually ball-type swivel connection between the free end of the screw and the movable jaw member carried thereby become worn.

Stated broadly, an object of the invention is the provision of a work clamp overcoming the aforementioned objections of the conventional clamp employing a clamping screw which is required to be rotated with respect to the clamp frame as aforesaid, characterized in that it employs a non-rotating clamping screw in conjunction with a tightening means therefor cooperating with both screw and clamp frame for imparting non-rotary axial movement to the screw to tighten it on the work.

Yet another broad object of the invention is the provision of a C-clamp type of work clamp which incorporates a means for tightening the clamping screw on the work without any possibility of turning or twisting the work or piece thereof and with a clamping force which is limited only by the ability of the clamp parts to withstand same.

Another important object of the invention is the provision of an improved work clamp of the C-clamp type which employs a non-rotating clamping screw in place of the objectionable rotating screw featuring the conventional C-clamp.

A further object of the invention is the provision of an improved quick-acting screw clamp employing a non-rotating clamping screw.

Yet another object of the invention is the provision of a C-clamp type of work clamp characterized by a design and principle of operation which adapts said clamp to both heavy duty as well as light work, and to being built to various shapes and sizes best suited to a particular application.

A further practical object of the invention is the provision of a work clamp of the non-rotating clamping screw type aforesaid whose construction and arrangement of parts is such that the clamp may be simply taken apart for replacement of worn or damaged parts.

Still another object of the invention is the provision of an improved double C-clamp characterized by a pair of non-rotating clamping screws, either one or both of which may be tightened on the work.

Still a further object of the invention is the provision of an improved heavy-duty C-clamp.

The above and other objects and improved features of a work clamp according to the present invention will appear from the following detailed description and accompanying drawing illustrative of a preferred form thereof, wherein:

Fig. 1 is a part-sectional side elevation of said work clamp illustrating the parts thereof in their non-clamping relation;

Fig. 2 is a similar view but showing the work clamp set up for and actively clamping two pieces of work, hereinafter for convenience called the work piece;

Fig. 3 is a section taken on line 3—3 of Fig. 1;

Figure 4:
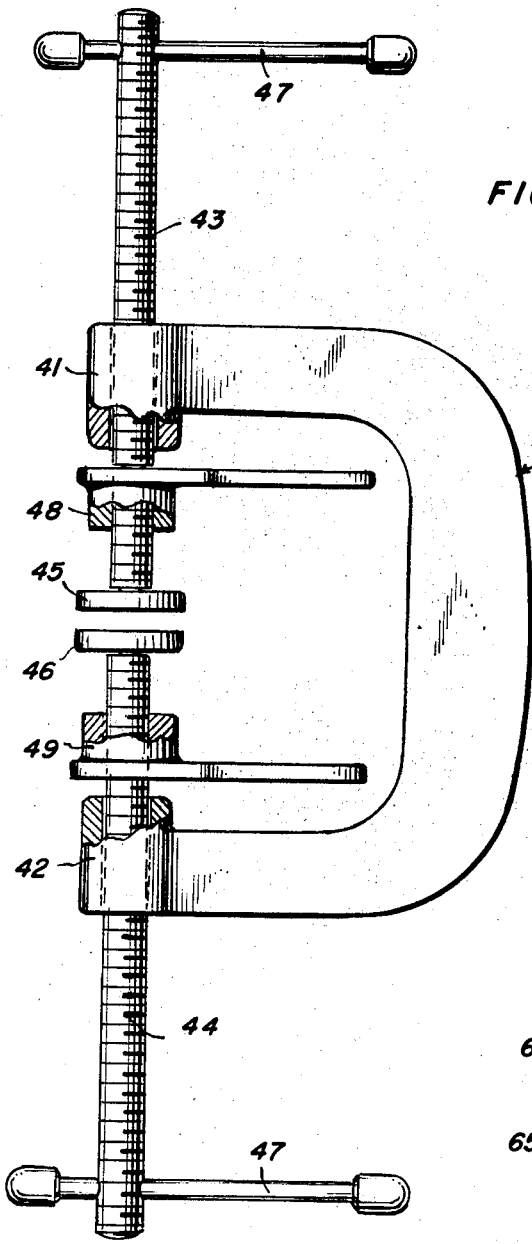
Fig. 4 is a side elevation of a modified or double clamp according to the invention which incorporates a pair of oppositely acting non-rotating clamping screws, either one or both of which may be tightened on to the work.

Referring to the drawings (Figs. 1–3) in detail, reference numeral 10 designates the frame or beam of a work clamp according to the invention which illustratively has C-shape but which may have straight or other appropriate beam shape. One end 12 of said C-frame carries the usually stationary clamp jaw 14 and the other end 16 of the frame mounts a clamping screw 18 which carries a movable jaw 20 at its inner or free end and is provided at its outer end with a handle 22 as is usual. However, rather than said other end 16 of the frame functioning as a fixed nut for the clamping screw, in which said screw must be turned to advance the movable jaw 20 to and retract it from the work and to tighten it on the work, it is a feature of the invention that the bore 24 in said other end through which the clamping screw 18 passes is threadless, with the result that said other end serves solely as a guide sleeve for the screw.

To actuate the clamping screw 18 axially so as to tighten it on the workpiece without any requirement to turn said screw with respect to the frame 10, the invention further provides a nut member 26 which is threadedly carried by said screw intermediate the movable jaw 20 and the inner end of the aforesaid threadless guide sleeve as formed by the other end 16 of the frame. To facilitate turning of said nut, it is provided with a handle 28 of length such that it can swing 360° through the concavity of the frame without interference. It will be observed that the handle end of the nut 26, which is enlarged, faces towards the inner-end edge of the sleeve 16, thus providing a relatively large bearing and wear surface.

Preferably, the movable jaw 20 is mounted both for free rotation on the inner end of the clamping screw 18 and so as to be readily removable. Referring to Fig. 3, illustrating the jaw-to-sleeve connection making this possible, it will be seen that the clamping screw terminates in a reduced diameter threadless end 30 of axial length somewhat less than the axial thickness of the movable jaw 20, which latter is shown to be circular in outline, and is provided with a central opening 32 of diameter corresponding substantially to that of said screw end 30 and a counterbore 34 provides a seat for the head of a jaw-securing screw 36 whose shank extends into a tapped opening therefor in the reduced diameter end 30 of the clamping screw. Thus, the jaw 20 is removably held to the clamping screw 18 by the securing screw 36, but is free to rotate on the reduced-diameter threadless end 30 thereof.

If desired or considered advisable for a particular application, the lower clamping jaw 14 may be similarly mounted for rotation on the lower frame end 12. It will also be understood that the circular flat faced clamping jaws illustrated may be replaced by jaws better suited to a particular work piece, for example, curved jaws for clamping pipe and similarly curved work, large flat jaws for cabinet work, angle jaws for offset work, etc.

In use, the screw and its movable jaw 20 is advanced toward the work piece designated WP in Fig. 2 (illustratively comprising two sheets required to be clamped together) simply by pushing the clamping screw axially through the threadless sleeve 16 of the frame until the movable jaw abuts the work piece. Assuming the nut 26 to be spaced downwardly from the inner-end edge of said frame sleeve 16, the clamping screw 18 is held stationary and the nut is spun by its handle 28 in direction as to climb said screw until it abuts said sleeve. When this occurs, further turning movement of the nut results in the clamping screw being tightened on the work by straight axial movement, the nut and screw now acting as a screw jack capable of applying extreme pressure on the work piece which of course renders the clamp capable of gripping anything to which it is attached with practically limitless holding pressure.

Alternatively, it is possible to rotate the clamping screw so as to advance it toward the workpiece by the simple expedient of holding the nut 26 and its handle 28 stationary and spinning the clamping screw by means of its handle 22. However, upon the movable jaw 20 abutting the workpiece, the nut handle is operated to impart straight axial movement to the screw, which latter is held against free rotation by engagement with the workpiece and/or by light hand pressure.

For certain types of work making it desirable or necessary that either or both the clamp jaws be tightenable on the workpiece, a double clamp illustratively shown in Fig. 4 has proved highly effective in practice. According to such a modified clamp, the C-frame 40 has both its ends formed as threadless guide sleeves 41, 42 (corresponding to the aforesaid guide sleeve 16) for receiving a pair of oppositely disposed and coaxially related clamping screws 43, 44 (corresponding to the aforesaid clamping screw 18), which carry movable jaws 45, 46 (corresponding to the aforesaid movable jaw 20) at their adjacent inner ends and are provided at their outer ends with the usual handle 47. Said clamping screws threadedly carry tightening means in the form of handled nut members 48, 49 (corresponding to the aforesaid nut member 26 and its handle 28) which are respectively disposed intermediate the guide sleeves 41, 42 and jaws 45, 46 as shown, so that they may move toward and away from said sleeves with their screws, yet are positionable so as to abut the inner ends of the sleeves when the screws are to be tightened and during tightening on the work.

Such a double clamp permits either or both of the jaws 45, 46 to be tightened on a workpiece placed intermediate said jaws, and hence is extremely flexible in use, particularly as to which end is up or down with respect to the workpiece, which screw is operated, etc.

Figure 5:
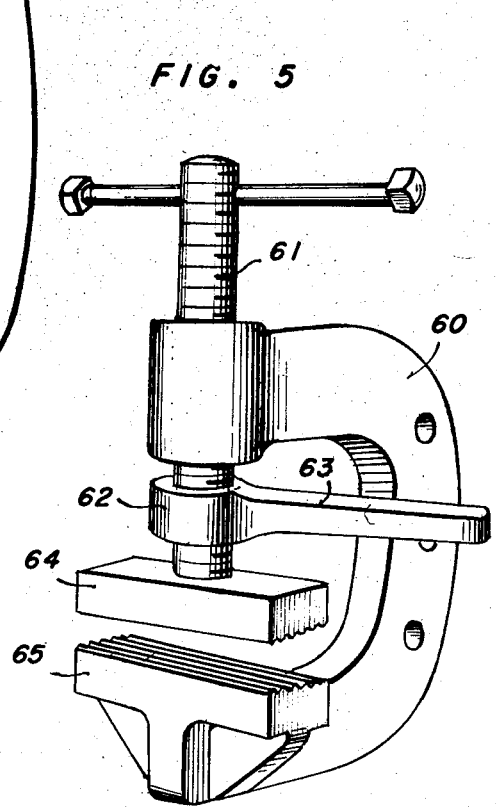
Fig. 5 is a perspective view of a typical heavy duty clamp embodying the non-rotating screw principle of the present invention.

While all prior C-clamps with which I am familiar were generally of the bench type capable of use only with so-called light work, a C-clamp of the invention is admirably suited to heavy-duty work such as, for example, clamping structural and bridge angle irons and like parts together. Fig. 5 illustrates such a heavy duty clamp, being characterized, in addition to the non-rotating clamping screw feature described in the foregoing, by the heavy and even massive construction of all its parts, whereby it is capable of accommodating large-size workpieces and of exerting great clamping and/or holding force thereon. That is to say, the C-frame 60 is of strong heavy construction capable of withstanding great strain, and the clamping screw 61, the tightening means (nut 62 and its handle 63) and the jaws 64, 65, which latter are shown to be of heavy bar shape and section, are equivalently strong and heavy, as adapts the clamp to heavy duty work, for which the prior C-clamps are not well suited.

Without further analysis, it will be manifest that a work clamp as described and illustrated satisfies in simple yet effective manner the desirable objectives of the invention as above set forth. Since the clamping screw is tightened on the work without rotative movement, there is no possibility of the workpiece being turned or twisted as is possible when the screw rotates as it tightens. Another feature of advantage of the nonrotating screw and tightening means combination is that practically unlimited turning force may be readily applied to the nut handle with a hammer or similar implement, for example, thereby to tighten the clamp to any desired degree, without any rotation of the screw with respect to the clamp frame and hence without the danger of the clamp jaws twisting from the workpiece. Also to be observed is that the high clamping force made possible as aforesaid is in the direction which the frame is normally built or can readily be built to withstand. Finally, should the screw and/or nut parts and/or movable jaw parts become worn through continued usage, the clamp can be simply taken apart for replacement of such parts as by removing the movable jaw (or jaws) from its clamping screw, unthreading the nut and its handle from the screw, and bodily removing the screw from the frame by slipping it outwardly through its guide sleeve.

As many changes could be made in carrying out the above construction without departing from the scope of the invention, it is intended that all matter contained in the above description or shown in the accompanying drawing shall be interpreted as illustrative and not in a limiting sense.

I claim:

1. A work clamp comprising a frame member having spaced, coaxially related end parts, at least one end part being formed as a threadless sleeve, a clamping screw extending through and having sliding fit in the bore of said sleeve and mounting a clamp jaw at its inner end and being provided with a generally transversely extending handle at its outer end, a companion clamp jaw operatively carried by said other frame end-part, a screw tightening nut carried by said screw intermediate its jaw and the inner end of said sleeve so as to be movable toward and away from said sleeve and being provided with a transversely extending torque-applying handle, said first clamping jaw being rotatably and removably secured to the inner end of the clamping screw, the construction and arrangement being such that the clamping screw may be translated axially towards said companion jaw either by turning the nut abutted against the inner end of the sleeve while holding the screw against rotation by its handle or by holding the nut against rotation and turning the adjusting screw in proper direction relative thereto, and being also such that upon removal of said first jaw and unthreading of said nut therefrom the adjusting screw may be bodily withdrawn through said threadless bore.

2. A work clamp substantially as set forth in claim 1, wherein said other end of the frame is also formed as a threadless sleeve and mounts a clamping screw which with its screw-tightening means and jaw is similar but disposed oppositely to said first clamping screw, the construction and arrangement being such that either or both of said screws may be translated axially as aforesaid.

References Cited in the file of this patent

UNITED STATES PATENTS

| | | |
|---|---|---|
| 855,989 | Shear et al. | June 4, 1907 |
| 863,433 | Patterson | Aug. 13, 1907 |
| 865,444 | Staley | Sept. 10, 1907 |
| 904,234 | Sievert | Nov. 17, 1908 |
| 1,549,567 | Baldwin | Aug. 11, 1925 |
| 1,680,923 | Williams | Aug. 14, 1928 |
| 1,849,805 | Raymond | Mar. 15, 1932 |
| 2,114,227 | Kriss | Apr. 12, 1938 |